Nov. 13, 1951  J. B. PETERSON  2,574,656

TRUE AIRSPEED INDICATO

Filed May 14, 1946

Inventor
JOHN B. PETERSON

By Strauch + Hoffman
Attorneys

Patented Nov. 13, 1951

2,574,656

UNITED STATES PATENT OFFICE 2,574,656

TRUE AIRSPEED INDICATOR

John B. Peterson, Bethesda, Md.; Ruth L. Peterson administratrix of said John B. Peterson, deceased Application May 14, 1946, Serial No. 669,545

6 Claims. (Cl. 73—182)

This invention relates to aircraft instruments, in particular to an electric true airspeed indicator.

The indications of Pitot-static airspeed indicators as currently used on aircraft must be corrected for altitude, temperature, and compressibility to obtain true airspeed. While systems designed to combine these factors automatically to give a true airspeed indication have been known in the past, as exemplified by the Patent No. 2,318,153 to Robert D. Gilson, I have provided a novel and improved instrument.

It is accordingly the primary object of my invention to provide a novel and improved true airspeed indicator.

It is a further object to provide an electric computer which operates an open scale instrument the indications of which are independent of variations in supply voltage.

A still further object is to provide a true airspeed indicator which utilizes the apparent temperature of the air rather than the true temperature.

Figure 1:
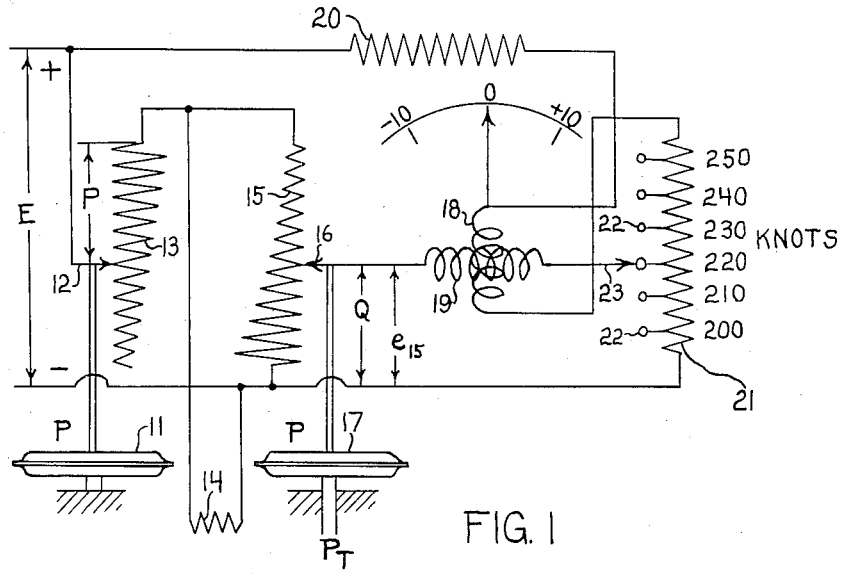
Figure 2:
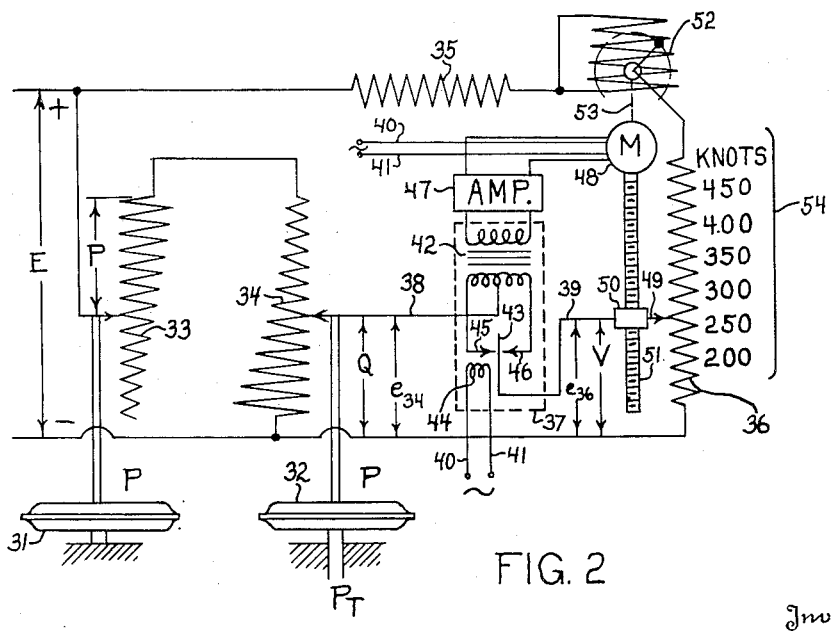

Other objects will become apparent as the description proceeds in connection with the drawings, wherein:

Figure 1 is a schematic diagram of a true airspeed indicator utilizing a ratio indicator; and Figure 2 is a schematic diagram of a true airspeed indicator using a null follow-up indicating system.

In developing the mathematical theory of the instrument the following terminology will be used:

V = the true air speed of the aircraft.
P = the static pressure of the air in which the aircraft is flying.
$P_T$ = the total or Pitot pressure
$Q = P_T - P$
T = the temperature of the air in which the aircraft is flying, degrees centigrade absolute.
U = the apparent temperature, equals T plus the adiabatic rise due to speed V.
a = the speed of sound.
M = the Mach number = V/a
E = the voltage of the direct-current supply.
e = voltage
i = current
R = resistance K, A, B, and x are constants, the values of which may be different for different equations.
F, F', F'' etc. are used to express an unique function of one variable or a definite combination of several variables, as in Equation 2 below.

The following equation for subsonic airspeeds has been derived from Equation 3a of National Advisory Committee for Aeronautics, Technical Report 420, published in 1932:

$$V = K\sqrt{\left[\left(1+\frac{Q}{P}\right)^{2/7}-1\right]T} \qquad (1)$$

or $$V = \left[F\left(\frac{Q}{P}\right)\right]\sqrt{T} \qquad (2)$$

The equation for supersonic speeds has been derived from equations given in "Aerodynamic Theory," vol. III, edited by W. F. Durand and published in 1940.

$$\frac{P_T}{P} = \frac{7M^2-1}{6}\left(\frac{36}{35}+\frac{36/35}{7M^2-1}\right)^{3.5} \qquad (3)$$

where the Mach number, $M = V/a$

Since the velocity of sound, a is independent of air pressure and varies directly as the square root of the absolute temperature, we can solve Equation 3 and write $$V = \left[F'\left(\frac{Q}{P}\right)\right]\sqrt{T} \qquad (4)$$

This equation for supersonic speeds is similar to Equation 2 for subsonic speeds, but the function takes a slightly different form.

For either subsonic or supersonic speeds we may write $$V^2 = F''\left(\frac{Q}{P}\right)(U-AV^2) \qquad (5)$$

Where $AV^2$ is the adiabatic temperature rise of the temperature element. A is a constant, associated with the temperature element and dependent on its shape and construction. The constant A will also be different for different units of speed, (knots, miles per hour, etc.). From Equation 5 we get $$V^2 = \frac{F''\left(\frac{Q}{P}\right)}{1+F''\left(\frac{Q}{P}\right)A} \cdot U$$

and $$V = \left[F'''\left(\frac{Q}{P}\right)\right]\sqrt{U} \qquad (6)$$

Thus for any particular temperature element we can determine the value of the constant A and write a true airspeed equation using the apparent temperature, including the adiabatic temperature rise.

For a given airspeed range, either subsonic or supersonic, Equation 2 or Equation 4 can be approximated by $$V \approx A\left(\frac{Q}{P}\right)^x \sqrt{T} \approx A\frac{Q^x}{P^x}\sqrt{T} \qquad (7)$$

The following similar approximation can be written for Equation 6

$$V \approx A\left(\frac{Q}{P}\right)^x \sqrt{U} \qquad (8)$$

To approximate the exact equation for a certain range, the values of the constants A and $x$ are selected so as to make the approximation equal to the accurate values at two points.

These exponential approximations are used in the instruments described in this application only in the calculation process. The errors, in each case are compensated for and do not appear in the instrument indication. Sample curves showing the magnitude of the errors for typical ranges are shown in my co-pending application Serial No. 669,544, filed May 14, 1946.

In Figure 1, evacuated bellows 11 is mounted in a compartment (not shown) which is airtight except for a connection to a static pressure source. The bellows 11, through a multiplying system not shown, operates a contactor 12 on rheostat 13. Rheostat 13 is shaped so that combined with the deflection characteristic of bellows 11 and the resistance of a temperature sensitive resistance element 14 at a temperature of 0° C. and the total resistance of a potentiometer 15, the current $i$ in potentiometer 15 is equal to $KE/P^x$. Then the temperature coefficient of temperature element 14 is selected so that at any temperature in the operating range, $$i_{15} = KE\frac{1}{P^x}\sqrt{U}$$

A contactor 16 on potentiometer 15 is operated through a multiplying system not shown, by a bellows 17 which is also mounted in the airtight compartment with the static bellows 11 and subjected to static pressure P. The inside of this bellows is subjected to total or Pitot pressure $P_T$ so that its deflection is a function of Q which is equal to $P_T-P$. The winding of potentiometer 15 is shaped so that in combination with the deflection characteristic of bellows 17, $$e_{15} = KE\left(\frac{Q}{P}\right)^x \sqrt{U}$$

By comparison with Equation 8 it is seen that by proper selection of constants this voltage can be made to vary directly as the true airspeed multiplied by the applied voltage E (in accordance with approximate Equation 8.

Coils 18 and 19 are respectively the voltage and null coils of a null type ratio indicator. The drawing represents a stationary coil moving magnet type indicator, but it is to be understood that a stationary magnet moving coil type can be used. The current in coil 18 is limited by fixed resistance 20 and potentiometer 21 and is proportional to the voltage of the supply E. When the current in coil 19 is zero, the pointer stands at the center. The deflection of the pointer is a function of the direction of current in coil 19 and of the ratio of current in coil 19 to the current in coil 18. Since both of these currents are directly dependent on the voltage of the supply E, voltage variations do not affect the indications.

Potentiometer 21 is provided with taps 22 which are engaged by the manually adjustable contactor 23. Each tap 22 has a speed indicia. The true air speed is then equal to the potentiometer setting plus the ratio instrument indication.

To compensate for the approximation errors introduced by the use of approximate Equation 9 the resistor units in potentiometer 21 may be adjusted.

The ratio indicator of Figure 1 could be replaced by a D'Arsonval indicator. The D'Arsonval indicator would have the advantage of greater sensitivity and the disadvantage that, except at zero indication, its indications would be affected by variations in the supply voltage.

Figure 2 shows a more elaborate true airspeed indicator which has the advantages (1) that no manual setting is necessary, (2) that the airspeed scale is linear and can be made as long and open as desired and (3) that power for feeding true airspeed into any equipment such as a bomb sight is available.

Static pressure bellows 31 and Pitot pressure bellows 32, rheostat 33 and potentiometer 34 serve the same purpose as the corresponding elements in Figure 1. The temperature sensitive resistance element 35 has been moved to the other side of the circuit and is identified by reference number 35. Its temperature coefficient is such that the current in potentiometer 36 is $$i_{36} = \frac{E}{\sqrt{U}}$$

Alternate methods for placing the temperature sensitive resistance element are shown in Figures 1 and 2.

The voltage output of potentiometer 34 is $$e_{34} = KE\left(\frac{Q}{P}\right)^x$$

A voltage detector or "chopper" 37 serves to detect any small direct current voltage which may exist between wires 38 and 39. This is the difference between voltages $e_{34}$ and $e_{36}$. The function of the chopper 37 is to change a small D. C. voltage to an interrupted D. C. or alternating voltage so that it can be amplified by an electronic amplifier. A source 40, 41 of alternating current is required to operate the chopper.

Wires 38 and 39 are connected respectively to the center tap of the primary of transformer 42 and to vibrating contact 43 which is vibrated by an alternating current electromagnet 44 to make contact alternately with contacts 45 and 46 which are connected to the primary of transformer 42. If any potential difference exists between wires 38 and 39, an alternating voltage will be developed in the secondary of transformer 42. This is amplified by amplifier 47 and fed into one phase of two phase induction motor 48. The other phase of this motor is constantly excited from the same A. C. source 40, 41 which supplies electromagnet 44. This makes motor 48 reversible, the direction of rotation depending on the relative polarity of wires 38 and 39. Motor 48 drives a contactor 49 on potentiometer 36, adjusting voltage $e_{36}$ to equal to voltage $e_{34}$. The contactor is carried by a nut 50 threaded on a worm shaft 51 which is driven in either direction by the motor 48.

The purpose of rheostat 52 is to compensate for the approximation error introduced by the use of approximate Equation 8. This error reaches a maximum negative error at the middle of the range, decreases to zero at each coincidence point and has positive values at the ends of the range. To compensate for these errors, the low resistance rheostat 52 is geared by any suitable means indicated by 53 to motor 48 and makes a slightly more than one-half revolution for the full range of the instrument. Its resistance is maximum at the middle of the range and reaches zero on either end. Slight shaping of potentiometer 36 to compensate for these errors is an alternate method.

An appropriate airspeed scale 54 is placed alongside potentiometer 36 from which can be read the true airspeed corresponding to the position of the contactor 49. Alternately, the shaft of motor 48 can be geared to an indicator of any desired type such as a multi-revolution round dial instrument, to indicate the position of contactor 49 and thus the true airspeed.

If we denote the position of the contactor 49 relative to the zero end of the potentiometer 36 as V we have:

$$e_{36} = KEV/\sqrt{U}$$
$$e_{34} = KE\left(\frac{Q}{P}\right)^x$$
$$e_{36} = e_{34}$$

therefore $$V = K\left(\frac{Q}{P}\right)^x \sqrt{U}$$

By proper selection of constants the last equation may be made identical with Equation 8.

The instruments described in this specification have delicate contacts operating on fine wire potentiometers. Such arrangements have given trouble in the past, but there are two factors which make their use permissible and which provide much improved performance.

First, the vibration which is always present in aircraft makes it possible to operate with slightly more contact pressure, than would otherwise be permissible.

Second, all of the delicate, bellows operated potentiometers are adaptable to hermetic sealing in an inert gas. In order to do this a lever is introduced between the bellows and the potentiometer contact. The lever is pivoted through the wall of a hermetically sealed compartment by means of a flexible diaphragm seal. This is common practice and is shown in my co-pending application Serial No. 669,543, filed May 14, 1946, now Patent No. 2,545,530. The use of a lever between the bellows and the potentiometer contact is also necessary in order to balance the parts against accelerations and vibrations and desirable because of the magnification of the bellows motion which may be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as new and desire to secure by United States Letters Patent is:

1. A true air-speed indicator comprising an electrical circuit including voltage supply lines; a first potentiometer having one end connected to one of said supply lines and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to the other voltage supply line; static pressure responsive means operable to position the contactor on said rheostat to vary the current therethrough as an exponential power of the static pressure; a second potentiometer connected across said voltage supply lines and having a contactor electrically connected to the contactor of said first potentiometer; means in the connection between the potentiometer contactors indicating the state of balance of the circuit; and means for indicating the true air speed as a function of the position of the contactor on said second potentiometer.

2. A true air-speed indicator comprising an electrical circuit including voltage supply lines; a first potentiometer having one end connected to one of said supply lines and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to the other voltage supply line; static pressure responsive means operable to position the contactor on said rheostat to vary the current therethrough as an exponential power of the static pressure; a second potentiometer connected across said voltage supply lines and having a contactor electrically connected to the contactor of said first potentiometer; means in the connection between the potentiometer contactors indicating the state of balance of the circuit; means for indicating the true air speed as a function of the position of the contactor on said second potentiometer; and a temperature sensitive resistance element connected in said circuit between said voltage supply lines and operative to cause the indicated air speed to vary as the square root of the apparent absolute air temperature.

3. A true air-speed indicator comprising an electrical circuit including first and second voltage supply lines; a first potentiometer having one end connected to said first supply line and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to said second voltage supply line; static pressure responsive means operable to position the contactor on said rheostat to vary the current therethrough as an exponential power of the static pressure; a second potentiometer connected across said voltage supply lines and having a contactor electrically connected to the contactor on said first potentiometer; means for indicating the true air speed as a function of the position of the contactor on said second potentiometer; a temperature sensitive resistance element connected in said circuit between said voltage supply lines and operative to cause the air speed indication to vary as the square root of the apparent absolute air temperature; and means electrically connected to the contactors of said potentiometers and responsive to a difference in voltage between said contactors to signal that a correction must be applied to the air speed indication provided by the position of the contactor on said second potentiometer.

4. A true air-speed indicator comprising an electrical circuit including first and second voltage supply lines; a first potentiometer having one end connected to said first supply line and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to said second voltage supply line; static pressure responsive means operable to position the contactor on said rheostat to vary the current therethrough as an exponential power of the static pressure; a second potentiometer connected across said voltage supply lines and having a contactor electrically connected to the contactor on said first potentiometer; means for indicating the true air speed as a function of the position of the contactor on said second potentiometer; a temperature sensitive resistance element connected in said circuit between said voltage supply lines and operative to cause the air speed indication to vary as the square root of the apparent absolute air temperature; and a null type ratio indicator having one coil electrically connecting the contactors of said potentiometers, and the other coil in series with one end of said second potentiometer and said second voltage supply line, to indicate any correction to be applied to said air speed indicating means.

5. A true air-speed indicator comprising an electrical circuit including first and second voltage supply lines; a first potentiometer having one end connected to said first supply line and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to said second voltage supply lines; static pressure responsive means operable to position the contactor on said rheostat to vary the current therethrough as an exponential power of the static pressure; a second potentiometer connected across said voltage supply lines and having a contactor electrically connected to the contactor on said first potentiometer; means for indicating the true air speed as a function of the position of the contactor on said second potentiometer; a temperature sensitive resistance element connected in said circuit between said voltage supply lines and operative to cause the air speed indication to vary as the square root of the apparent absolute air temperature; and means electrically connected to the contactors of said potentiometers and responsive to a difference in voltage between said contactors to shift the contactor on said second potentiometer until there is no difference in voltage between said contactors.

6. A true air-speed indicator comprising an electrical circuit including first and second voltage supply lines; a first potentiometer having one end connected to said first supply line and having a contactor; a Pitot-static differential pressure responsive means operable to position the contactor on said first potentiometer so that the resistance between said one end and said contactor varies as an exponential power of the Pitot-static differential pressure; a rheostat connected to the other end of said potentiometer and having a contactor connected to said second voltage supply line; static pressure responsive means operable to position the contactor on said rheostat to vary the current therethrough as an exponential power of the static pressure; a temperature sensitive resistance element connected in parallel with said first potentiometer and operative to cause the current in said first potentiometer to vary as the square root of the apparent absolute temperature; a second potentiometer connected across said voltage supply lines and having a contactor electrically connected to the contactor on said first potentiometer; means for indicating the true air speed as a function of the position of the contactor on said second potentiometer; and means electrically connected to the contactors of said potentiometers and responsive to a difference in voltage between said contactors to signal that a correction must be applied to the air speed indication provided by the position of the contactor on said second potentiometer.

JOHN B. PETERSON.

REFERENCES CITED

The following references are of record in the file of this patent:

UNITED STATES PATENTS

| Number | Name | Date |
|---|---|---|
| 1,449,437 | Obermaier | Mar. 27, 1923 |
| 2,318,153 | Gilson | May 4, 1943 |